May 14, 1963

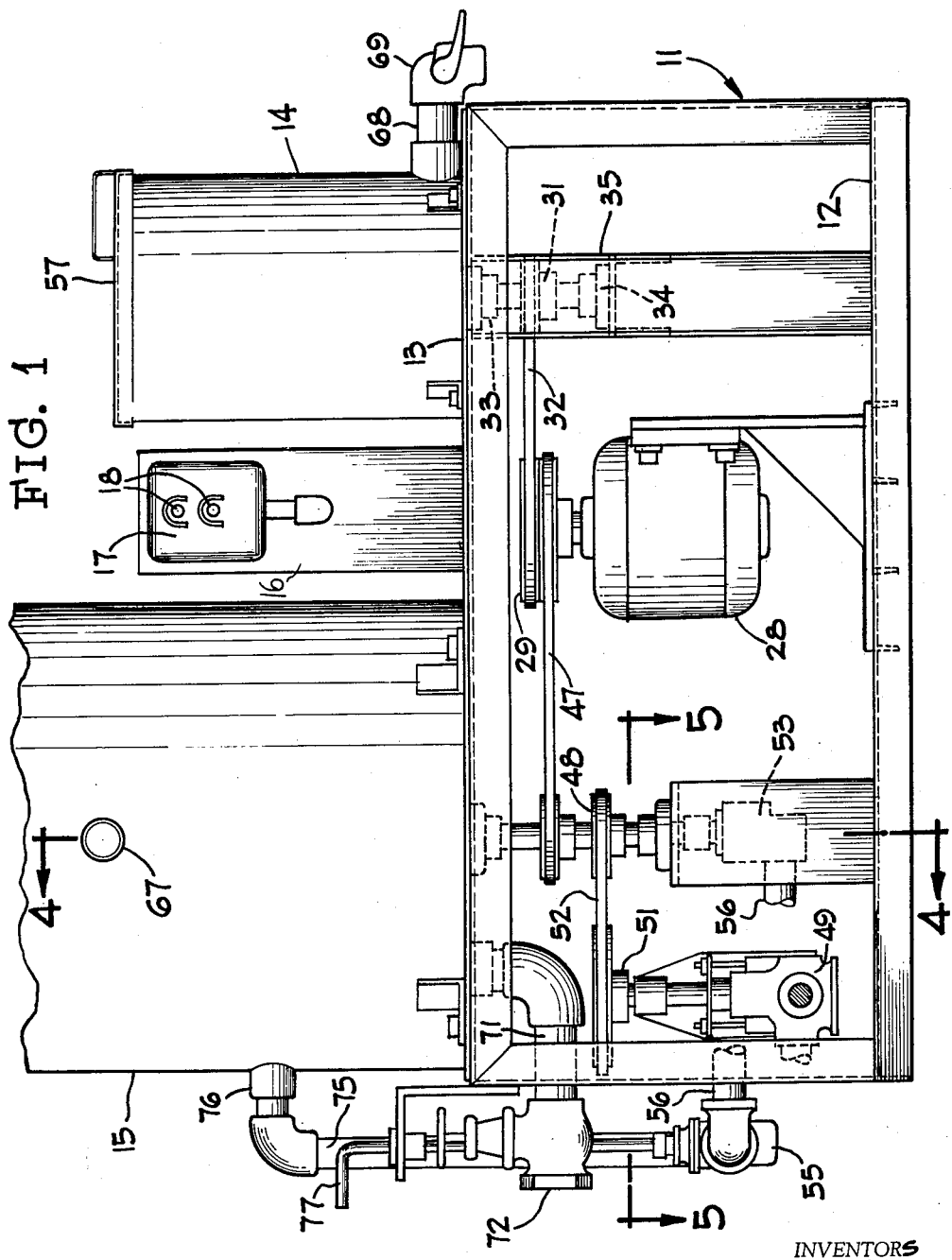

E. R. JAHN ET AL 3,089,167

FILTER TUBE CLEANER

Filed Oct. 31, 1960

INVENTORS
EDWARD R. JAHN
ALVIN J. ZAUPA
BY
*Schramm, Kramer & Sturges*

ATTORNEYS

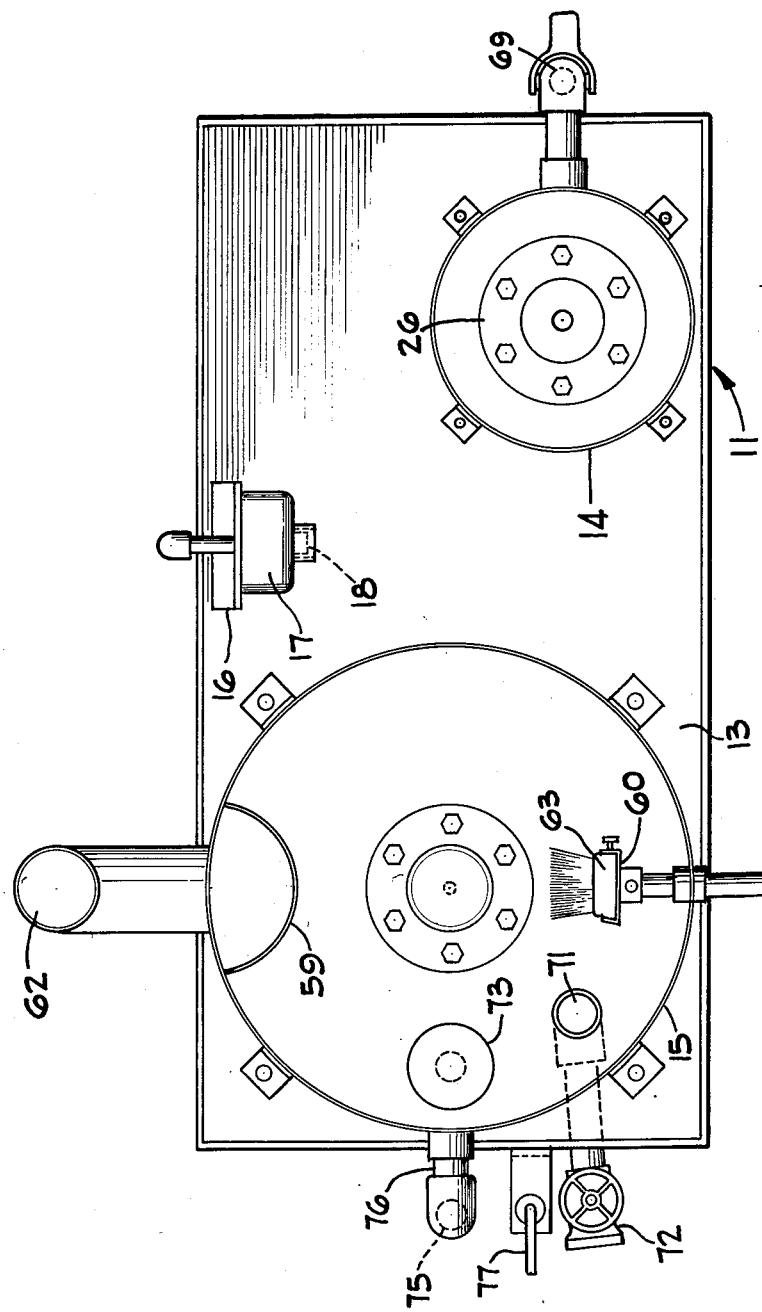

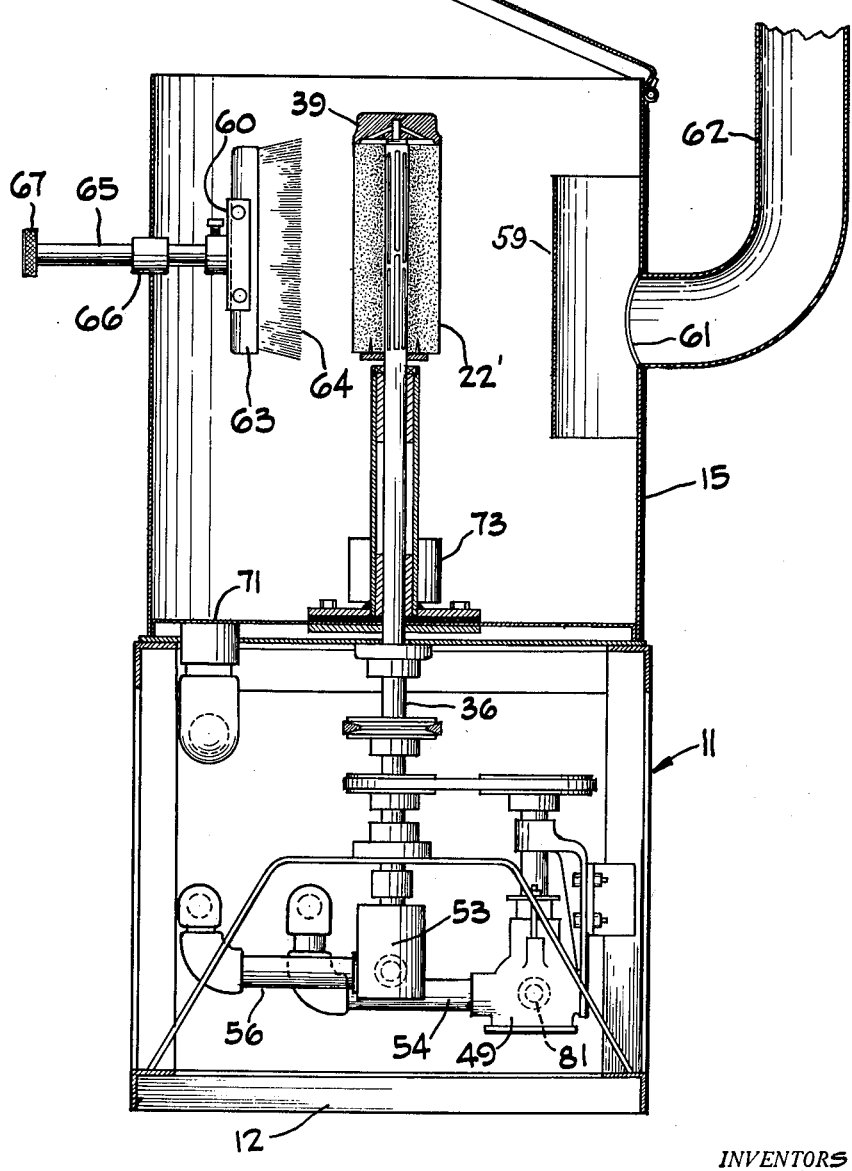

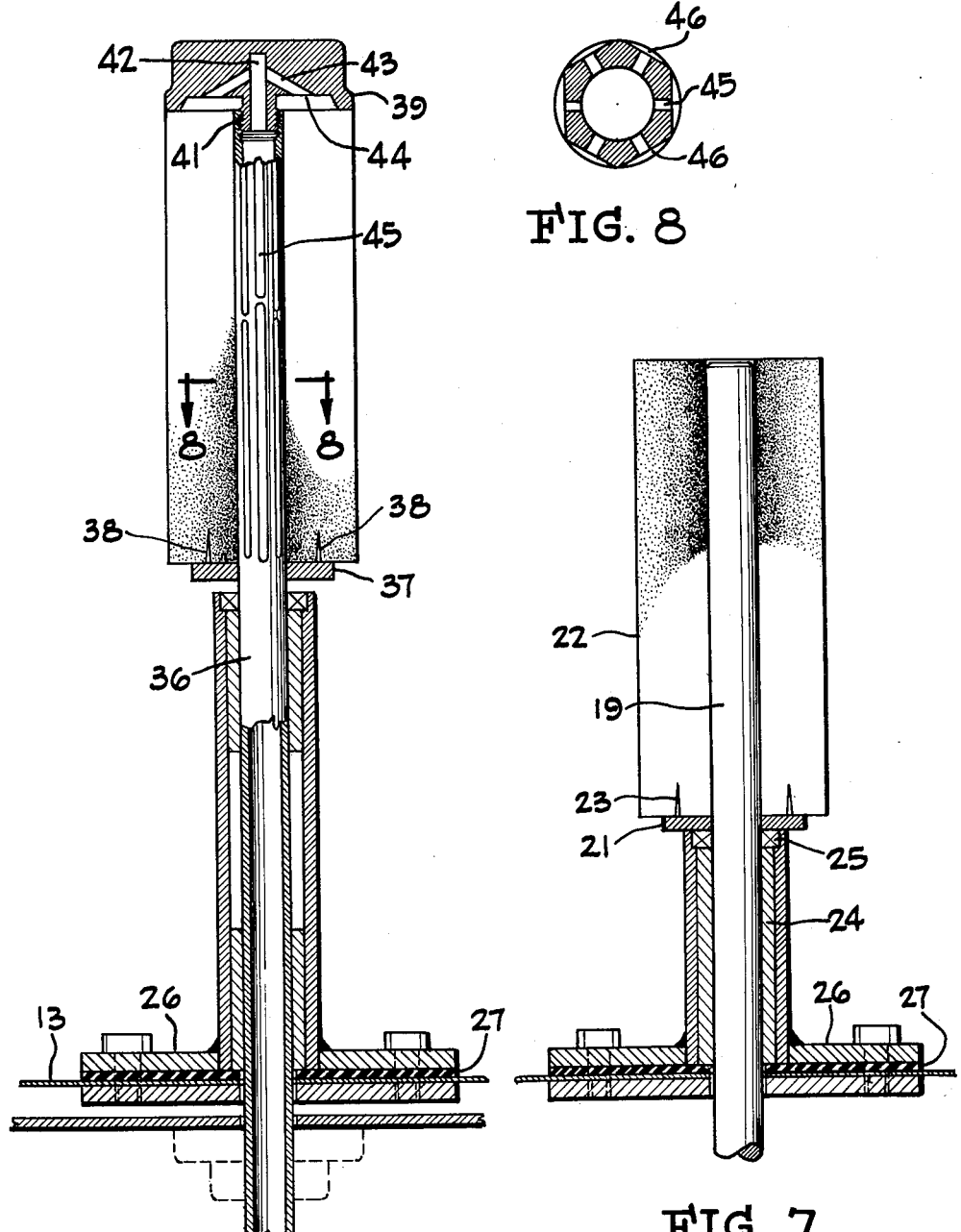

3,089,167
Patented May 14, 1963

1

3,089,167
FILTER TUBE CLEANER
Edward R. Jahn and Alvin J. Zaupa, Chicago, Ill., assignors to The Sherwin-Williams Company, Cleveland, Ohio, a corporation of Ohio
Filed Oct. 31, 1960, Ser. No. 66,324
4 Claims. (Cl. 15—4)

An object of the invention is the cleaning of filter tubes to enable them to be reused many times and to provide virtually indefinite service even in the filtration of such substances as paint which may contain substances tending to clog the pores of fibrous filter tubes.

An object of the invention is to maintain high speed operation of filter tubes and to maintain the efficiency thereof. A further object is to overcome the decreased through put of plugged filter tubes.

Still another object of the invention is to accomplish rapid cleaning of filter tubes of the type composed of wool fibers in a phenolic binder which is heat set and impervious to common paint solvents in which the voids become progressively finer from the outside to the inside of the filter tube.

A further object of the invention is to enable washing solvent to be employed in the cleaning of filter tubes without contaminating the washing solvent and to reduce the quantities of solvent required.

A more specific object of the invention is to throw off a bulk of the heavy and large contaminants and to remove most of the retained paint, or other liquid which has been filtered, from a filter tube before flushing the filter tube with solvent for cleaning.

Other and further objects, features and advantages of the invention will become apparent as the description proceeds.

For the filtration of paint and other liquids a depth-type filter tube is employed composed of wool fibers in a phenolic binder which is heat set and impervious to common solvents such as paint solvents when the tube is being employed for straining paint. The tube is composed of wool fibers graded toward the center of the tube to become finer and provide finer voids. In the use of the tube for straining or filtering liquids the liquid to be filtered is passed through the walls of the filter tube from the outside and the filtered liquid passes to the opening in the center of the tube, from which it is caused to flow away. In the course of continued use of such a filter tube, contaminants of the liquid being filtered gradually fill the voids of the tube with the larger particles of contaminant filling the voids near the outer surface of the tube and covering the surface thereof and smaller particles being restrained in the finer voids near the center of the tube. With continued use of such filter tubes pressure builds up and the through put decreases until it stops entirely or slows to the point where economics has heretofore required discarding the tube.

In carrying out the invention in accordance with a preferred form thereof, after a filter tube has been used sufficiently long so that the pressure of liquid to be filtered passing through builds up, the tube is removed from the filtration apparatus and placed upon a solid shaft which is caused to rotate throwing off the bulk of the heavy large contaminants by centrifugal force. In the case of a tube used for straining paint, most of the retained paint to the extent of a pint or a quart is removed by centrifugal force. Then the tube is removed from the solid rotatable shaft and mounted upon a second shaft or spindle which is hollow and has openings in the walls of the spindle along the portion of the spindle surrounded by the tube to be cleaned. A suitable solvent is forced through the hollow spindle outward through the openings passing out

2 through the walls of the filter tube. The direction of flow of the solvent thus is the reverse of the direction of flow of liquid when the filter tube is in use for filtration or straining of a liquid. The hollow spindle is rotated so that a filter tube is further cleaned by centrifugal force in conjunction with the flow of solvent and simultaneously a brush is pressed against the surface of the rotating filter tube to brush off any contaminants adhering to the outer surface of the filter tube or being forced outward from the voids within the tube by the conjoint action of the centrifugal force and flowing solvent.

A better understanding of the invention will be afforded by the following detailed description considered in conjunction with the accompanying drawing in which:

FIG. 1 is a side elevation of a filter tube cleaner constituting an embodiment of the invention;

FIG. 3 is a plan view of the filter tube cleaner with chamber lids removed;

FIG. 4 is a view of a vertical cross section of the apparatus represented as cut by a plane 4—4 indicated in FIG. 1 as seen when looking toward the left in the apparatus of FIG. 1;

FIG. 6 is a fragmentary view to a larger scale of a section including a filter tube to be cleaned mounted on a hollow spindle for cleaning by solvent conjointly with centrifugal force;

FIG. 7 is a corresponding view of a section including a filter tube to be cleaned, mounted on a solid spindle for initial cleaning by centrifugal force;

FIG. 8 is an enlarged view of a section of the hollow spindle represented as cut by a horizontal plane 8—8 indicated in FIG. 6.

Like reference characters are utilized throughout the drawing to designate like parts.

Figure 5:
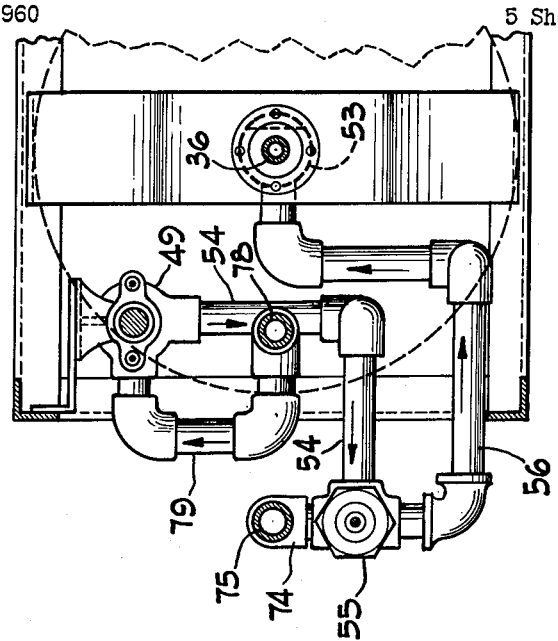
FIG. 5 is a fragmentary view of the apparatus showing solvent piping partially in section to a larger scale and more detailed than in FIG. 3 and showing a horizontal section represented as cut by a plane 5—5 indicated in FIG. 1.
Figure 2:
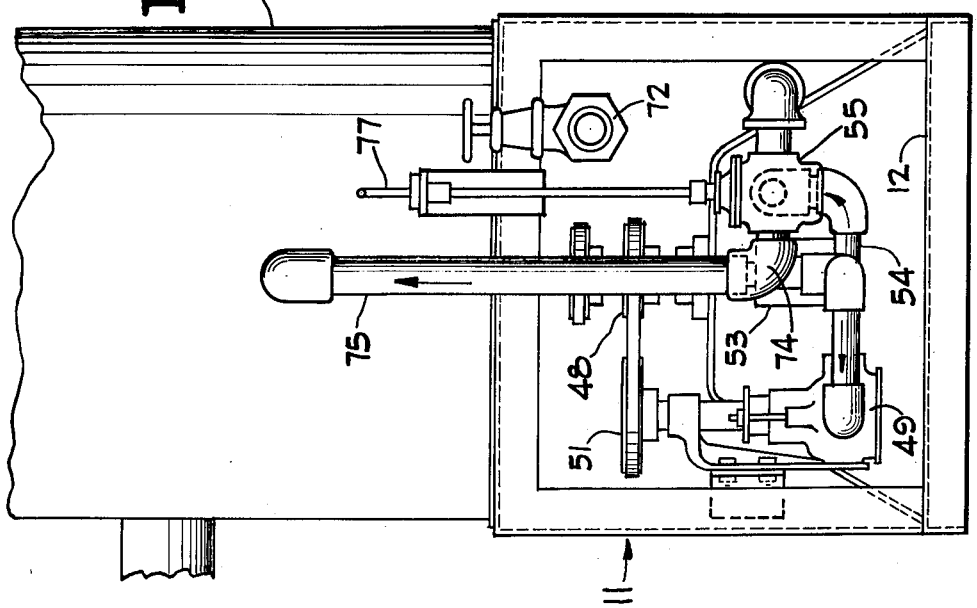
FIG. 2 is an end elevation of the apparatus of FIG. 1 as seen from the left hand end of the apparatus as shown in FIG. 1.

In the embodiment of the invention illustrated in the drawings there is a framework 11 constituting a platform having a base 12 and a table 13. The latter supports a smaller cylindrical chamber 14 and a larger cylindrical chamber 15 together with a bracket 16 carrying a schematically indicated motor starter 17 of conventional type with on-off push buttons 18.

Coaxially mounted within the smaller chamber 14 is a solid rotatable shaft or spindle 19 with a collar 21 for supporting a filter tube 22 being given its initial cleaning operation. Preferably the filter tube supporting collar 21 is provided with upwardly extending pins or prongs 23 to insure rotation of the filter tube 22 with rotation of the vertical shaft 19.

For rotatably supporting the spindle 19, an oil bearing 24 is provided having a seal 25 at the upper end to keep paint or other liquids out of the oil bearing 24. The oil bearing 24 in turn is supported upon the table 13 constituting a tank bottom by means of an anchor flange 26, bolted or otherwise suitably secured to the tank bottom 13 and sealed by a suitable gasket 27.

For rotating the solid spindle 19 there is a vertical shaft motor 28 connected to the solid spindle 19 by suitable means such as a motor sheave 29, a shaft pulley 31 and a connecting belt 32. Suitable bearings are provided for the pulley end of the shaft 19 including a bearing 33 secured to the table top 13 and a bearing 34 secured to uprights 35 mounted between the base 12 and the table 13. Suitable electrical connections of a conventional type (not shown) are provided for enabling the starter 17 to control the starting and stopping of the motor 28.

Within the larger chamber 15 there is a second rotatable shaft or spindle, in this case a hollow spindle 36, which is shown in FIG. 6 is also adapted to carry a filter tube to be cleaned. Actually in practice it is the same filter tube 22 which is transferred from the shaft 19 to the shaft 36 after the initial cleaning operation has been performed by rotation of the shaft 19. For clarity in a filter tube on the shaft 36 is designated by reference numeral 22'. The hollow spindle 36 is also provided with a pin washer or collar 37 with pins or prongs 38 adapted to extend into the fibrous material of the filter tube 22' to cause it to rotate with the hollow spindle 36.

For maintaining the position of the filter tube 22' upon the hollow spindle 36 and properly directly the flow of solvent issuing from the upper end of the hollow spindle 36, a cap 39 is provided. The latter is secured in any suitable manner to the upper end of the hollow spindle 36. For example, as shown, the cap 39 is formed with a stem 41 outwardly threaded and adapted to mate with internal threads in the end of the hollow spindle 36. The cap 39 is formed with a central passageway 42 communicating with the interior of the hollow spindle 36 but closed at the upper end and having downwardly slanting, outwardly extending branch passageways 43 with openings 44 against the upper end of the filter tube 22'.

As shown in FIGS. 6 and 8 the portion of the hollow spindle 36 between the washer or collar 37 and the cap 39 has longitudinally extending peripheral openings 45 for directing solvent from the interior of the hollow spindle 36 into the filter tube 22' for flushing out any contaminants embedded in the voids in the filter tube 22'. In order to assure that substantially all portions of the mass of the filter tube 22' from the inner periphery outward are subjected to the action of the flowing solvent, recesses are preferably formed in the surface of the portion of the hollow spindle 36 surrounded by the filter tube 22', that is, between the collar 37 and the cap 39. For example, as shown more clearly in FIG. 8, the cross section of this portion of the hollow spindle 36 may be hexagonal in shape leaving recesses 46 serving as mouths of the openings 45 to subject substantially the entire inner surface of the filter tube 22' to the action of the solvent flowing from the interior of the hollow spindle 36.

As illustrated in FIGS. 1 and 6, the hollow spindle 36 is rotatably mounted in a manner similar to that of the solid spindle 19 with corresponding supporting elements and also rotatably driven from the motor 28 by means of a belt 47. However, the hollow spindle 36 carries an additional sheave 48 for driving a solvent pump 49 through a pump sheave 51 and a connecting belt 52. In addition, a rotary union 53 is mounted at the lower end of the hollow spindle 36 for connecting the interior of the hollow spindle 36 to the solvent pump 49 through a pump outlet pipe 54, the rotary union 53 and a pipe 56 connecting one outlet of the three-way valve 55 to the rotary union 53.

In order to prevent spattering of the substances thrown from the filter tubes in the cleaner, the smaller chamber 14 is provided with a loose lid 57 and the larger chamber 15 is provided with a hinged lid 58. There is also a splash shield 59 within the larger chamber 15 in the form of a semi-cylindrical length of sheet metal secured to the inner surface of the cylindrical chamber 15 and extending beyond both sides and above and below a vent opening 61 communicating with an exhaust pipe 62.

Adjustably mounted within the larger chamber 15 is also a brush 63 having bristles 64 extending somewhat further than the length of the filter tube 22' to be cleaned. The brush 63 is mounted upon the end of a horizontal shaft 65 mounted axially movable in a bushing 66 secured in the wall of the chamber 15 and having a suitable handle such as a knurled knob 67 by means of which the brush 63 may be pulled outward or moved inward in order to bear against the surface of the filter tube 22' while it is rotating so as to brush off all materials which have been brought to the surface by centrifugal action and the flow of solvent forced through the filter tube 22' by the action of the pump 49.

The smaller chamber 14 is provided with a discharge pipe 68 at the lower end thereof. The outer end of the discharge pipe 68 in turn is provided with a wide opening valve 69 of conventional type such as valve known as a molasses valve, for example, to permit outflow of thick paint or other material cleared from the surface and interior of the filter tube 22' by the centrifugal force. It will be understood that the molasses valve 69 is opened at intervals to discharge the material to a waste bucket (not shown) before the liquid height in the smaller chamber 14 has reached the height of the seal 25. The larger chamber 15 is also provided with an outlet pipe 71 at the lower end for discharging dirty solvent when necessary to a waste pail through an openable valve 72. However, the solvent employed in the larger chamber 15 is kept relatively free from contaminants by reason of the initial centrifugal action of the solid spindle 19 and by provision of a strainer 73 so that the solvent is normally recirculated by the pump 49 for a considerable period of time. It will be understood that when the filter tubes are employed for filtering such materials as paints, ordinarily the filter tubes will be segregated and separately cleaned when they have been used for different materials, for example the filter tubes for white paint would ordinarily be cleaned separately from those for colored paint and in many cases these in turn would be cleaned separately from those for black paint.

The three-way valve 55 has a second outlet 74 to which a vertical by-pass pipe 75 is connected which has an outlet opening 76 into the wall of the larger chamber 15. The three-way valve 55 is conventional in construction having a control handle 77 for forming a passageway from the inlet constituting the pump discharge pipe 54 to either the outlet pipe 56 communicating with the rotary union 53 or a second outlet 74 communicating with the by-pass pipe 75.

In order to produce a clear liquid material such as paint, for example, preparatory to filling cans, such liquid is pumped through the walls of filter tubes such as the filter tube 22 which may be mounted in a conventional filtration apparatus causing the liquid to pass through the outer surfaces of the filter tube through the walls thereof, to the opening in the interior and outward through the opening. After the filter tube has become sufficiently plugged with contaminants to interfere with the fast flow of liquid therethrough without subjecting the same to excessive pressure and in order to assure the maintenance of effective filter action, the filter tube 22 is removed from the filtration unit and placed in the cleaning apparatus illustrated in the drawings. It is first mounted upon the solid spindle 19 while a previously handled filter tube 22' is upon the hollow spindle 36 and both spindles are then rotated so that the action takes place in both parts of the apparatus simultaneously. Any coarse materials are driven from the filter tube 22 by centrifugal action and a greater part of the paint or other liquid trapped within the voids of the filter tube is thrown out so that it can be removed through the molasses valve 69.

Thereupon the motor is stopped and the filter tube upon the solid shaft 19 is transferred to the hollow spindle 36, the filter tube previously upon the hollow tube 36 having been removed and another tube to be cleaned having been placed upon the solid spindle 19. The motor is again started and further cleaning of the filter tube 22 takes place, this time by the conjoint action of centrifugal force and solvent being forced upward through the hollow spindle 36 and outward through the openings 45 and through the walls of the filter tube while the surface thereof is brushed by the brush 63.

The solvent in the lower portion of the larger chamber 15 is continuously recirculated discharging through the strainer 73, pipes 78 and 79, through the pump intake 81, through the solvent circulating pump 49, the pipe 54, and three-way valve 55, the pipe 56, the rotary union 53, the interior of the hollow spindle 36, the lateral openings 45 therein, the recesses or cavities 46 out through the walls of the filter tube into the chamber 15 and out again through the strainer 73. When there is no filter tube mounted upon the hollow spindle 36 and it is desired to clarify the solvent, this may be done by turning the control handle 77 of the three-way valve 55 to the alternative position so that the solvent circulates through the outlet 74, the by-pass pipe 75, the mouth 76, the chamber 15, the strainer 73, and pipes 78, 79 and 81, back through the pump 49, the pipe 54 and the inlet to the three-way valve 55.

Other modes of applying the principle of this invention may be employed instead of those specifically set forth above, changes being made as regards the details herein disclosed provided the elements set forth in any of the following claims, or the equivalent of such be employed.

It is, therefore, particularly pointed out and distinctly claimed as the invention:

1. A filter tube cleaner comprising in combination a chamber containing a rotatable spindle for carrying a filter tube to be cleaned and clearing the filter surface and interior of heavy particles by centrifugal force, a second chamber containing a rotatable hollow spindle carrying a collar for supporting a filter tube to be cleaned and a cap for securing the filter tube between the cap and the collar, the cap and the portion of the hollow spindle between the collar and the cap having openings, a brush mounted within said second chamber radially movable toward said hollow spindle for contacting the surface of the filter tube mounted thereon, a frame work supporting both spindles, a motor mounted in said frame work connected to both spindles, and means for forcing solvent through said openings from the hollow spindle outward through the mass of the filter tube, whereby the interior and surface of the filter tube on the hollow spindle are cleared simultaneously by flowing solvent action, centrifugal force and brushing.

2. A filter tube cleaner comprising in combination a chamber containing a rotatable hollow spindle carrying a collar for supporting a filter tube to be cleaned and a cap for securing the filter tube between the cap and the collar, the cap and the portion of the hollow spindle between the collar and the cap having openings and means for forcing solvent through said openings from the hollow spindle outward through the mass of the filter tube, whereby the surface and the interior of the filter tube are cleared simultaneously by flowing solvent action and centrifugal force, the cap openings including radially extending chambers with lateral outlets, an axial passageway and passageways connecting the axial passageway to the chambers, the spindle opening including longitudinal openings extending parallel to the spindle and an end opening communicating with the cap axial passageway.

3. A filter tube cleaner as in claim 2, wherein a brush is mounted within the chamber radially movable toward said hollow spindle for contacting the surface of the filter tube mounted thereon to assist the clearing action by brushing.

4. A filter tube cleaner comprising in combination a hollow spindle adapted to carry a filter tube to be cleaned, the portion of the hollow spindle adapted to receive the filter tube having lateral longitudinal openings extending parallel to the spindle and in aligned pairs, means for driving the spindle rotatably and means for forcing solvent through said spindle openings from the hollow spindle outward through the mass of a filter tube to be cleaned, the hollow spindle being provided with a collar for supporting a filter tube to be cleaned and a cap, the cap being formed with passageways connected to the interior of the hollow tube with openings directed towards said collar whereby a filter tube between said collar and said cap is subjected to longitudinal flow of solvent from the openings in said cap and the surface and the interior of the filter tube are cleared simultaneously by flowing solvent action and centrifugal force.

References Cited in the file of this patent

UNITED STATES PATENTS

| | | |
|---|---|---|
| 740,367 | Knight | Sept. 29, 1903 |
| 872,702 | Vodoz | Dec. 3, 1907 |
| 1,945,491 | Lamort | Jan. 30, 1934 |
| 2,099,502 | Stockdale | Nov. 16, 1937 |
| 2,293,120 | De Lisle | Aug. 18, 1942 |
| 2,539,768 | Anderson | Jan. 30, 1951 |
| 2,781,916 | Coleman | Feb. 19, 1957 |
| 2,919,704 | Butler | Jan. 5, 1960 |
| 2,963,163 | Veres | Dec. 6, 1960 |